United States Patent
Soderqvist

(10) Patent No.: US 11,085,222 B2
(45) Date of Patent: Aug. 10, 2021

(54) METHOD FOR SET UP OF A DOOR OPERATOR AND A DOOR OPERATOR

(71) Applicant: ASSA ABLOY ENTRANCE SYSTEMS AB, Landskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 439 days.

(21) Appl. No.: 16/306,382

(22) PCT Filed: Jun. 12, 2017

(86) PCT No.: PCT/EP2017/064234
§ 371 (c)(1),
(2) Date: Nov. 30, 2018

(87) PCT Pub. No.: WO2017/220361
PCT Pub. Date: Dec. 28, 2017

(65) Prior Publication Data
US 2019/0153767 A1    May 23, 2019

(30) Foreign Application Priority Data
Jun. 22, 2016 (SE) .................................... 1630161-6

(51) Int. Cl.
*E05F 15/611* (2015.01)
*E05F 15/632* (2015.01)
(Continued)

(52) U.S. Cl.
CPC .......... *E05F 15/611* (2015.01); *E05F 15/603* (2015.01); *E05F 15/632* (2015.01);
(Continued)

(58) Field of Classification Search
USPC .......................................................... 318/560
See application file for complete search history.

(56) References Cited

U.S. PATENT DOCUMENTS 4,119,896 A * 10/1978 Estes, III ................ E05F 15/41
                                                                318/266
5,808,246 A *  9/1998 Peruggi ................. B66B 13/143
                                                                187/316
(Continued)

OTHER PUBLICATIONS

Swedish Search Report mailed in 1630161-6 dated Mar. 3, 2017 (5 pages).
(Continued)

*Primary Examiner* — Bentsu Ro
(74) *Attorney, Agent, or Firm* — Wissing Miller LLP

(57) ABSTRACT

The present invention relates to a door operator and a method for set up of a door operator (1) comprising a drive unit (7), a user interface (8) and a control unit (9), which control unit (9) controls the value of the current applied to the drive unit (7) such that the door operator (1) employs a first speed trajectory corresponding to the value of the current when opening and/or closing a door leaf (2) connected to the door operator (1), the method comprising the steps of: detecting a first or a second mode of set up of the control unit (9), and in the first mode, receiving a value of the time for opening and/or closing the door leaf (2) from the user interface (8), calculating a value of the current that should be applied to the drive unit (7) during acceleration and braking to obtain said value of the time for opening and/or closing the door leaf (2), and setting the calculated value of the current in the control unit (9), such that the door operator (1) employs the first speed trajectory when opening and/or closing a door leaf (2) connected to the door operator (1) corresponding to said set value of the time, in the second mode receiving a value of the current that should be applied (Continued)

to the drive unit (7) when opening and/or closing the door leaf (2) from the user interface (8), setting the value of the current in said control unit (9) that should be applied to the drive unit (7) during acceleration and braking such that the door operator (1) employs the first speed trajectory when opening and/or closing a door leaf (2) connected to the door operator (1) corresponding to said set value of the current.

13 Claims, 3 Drawing Sheets

(51) Int. Cl.
    *E05F 15/603*     (2015.01)
    *G05F 1/10*     (2006.01)
    *H02P 6/28*     (2016.01)

(52) U.S. Cl.
    CPC ............... *G05F 1/10* (2013.01); *H02P 6/28* (2016.02); *E05Y 2400/20* (2013.01); *E05Y 2400/31* (2013.01); *E05Y 2400/32* (2013.01); *E05Y 2400/36* (2013.01); *E05Y 2400/45* (2013.01); *E05Y 2400/456* (2013.01); *E05Y 2400/564* (2013.01); *E05Y 2400/80* (2013.01); *E05Y 2400/85* (2013.01); *E05Y 2900/132* (2013.01)

(56) References Cited

U.S. PATENT DOCUMENTS

| | | | | |
|---|---|---|---|---|
| 6,137,255 | A | * | 10/2000 | Skalski ............... G05B 19/232 |
| | | | | 318/560 |
| 2006/0244271 | A1 | | 11/2006 | Hass |
| 2006/0255757 | A1 | | 11/2006 | Sommer |
| 2008/0135346 | A1 | * | 6/2008 | Kattainen ............ B66B 1/3492 |
| | | | | 187/394 |
| 2009/0265992 | A1 | | 10/2009 | Hass et al. |
| 2010/0115853 | A1 | | 5/2010 | Gebhart et al. |
| 2010/0242368 | A1 | | 9/2010 | Yulkowski et al. |
| 2016/0130853 | A1 | | 5/2016 | Tehranchi |
| 2017/0103648 | A1 | | 4/2017 | Bodurka |
| 2019/0153767 | A1 | * | 5/2019 | Soderqvist ............ E05F 15/603 |

OTHER PUBLICATIONS

International Search Report and Written Opinion mailed in PCT/EP2017/064234 dated Aug. 29, 2017 (5 pages).

* cited by examiner

METHOD FOR SET UP OF A DOOR OPERATOR AND A DOOR OPERATOR

This application is a 371 of PCT/EP2017/064234 filed on Jun. 12, 2017, published on Dec. 28, 2017 under publication number WO 2017/220361, which claims priority benefits from Swedish Patent Application No. 1630161-6 filed Jun. 22, 2016, the disclosure of which is incorporated herein by reference.

FIELD OF THE INVENTION

The present invention relates to a door operator and a method for set up of a door operator.

BACKGROUND OF THE INVENTION

Automatic door sets are regulated by standards such as the European standard EN16005 which defines, i.e., pedestrian protection requirements for door sets. These regulations define, e.g., maximum kinetic energy, maximum closing force, opening and closing time, opening and closing time for different parts of the speed trajectory of a door and use of safety sensors. These regulations also define a minimum time for closing the door the last 10° and for opening the door the last 10°, the minimum times are dependent on the time for opening and/or closing the door during the remaining angle.

These regulations were created in order to minimise the risk of injuries to any individual located in the closing path of a door leaf during closing. The regulations do not define how the door operator could be operated to reduce the energy consumption of the door operator and still fulfil the regulations.

SUMMARY OF THE INVENTION

It is an object of the present invention to mitigate the above problems, and to provide a solution for set up of a door operator in accordance with the regulations and yet in an energy efficient way. According to a first aspect of the present invention, these objects are achieved by a method for set up of a door operator comprising a drive unit, a user interface and a control unit, which control unit controls the value of the current applied to the drive unit such that the door operator employs a first speed trajectory corresponding to the value of the current when opening and/or closing a door leaf connected to the door operator. The method comprises the steps of detecting a first or a second mode of set up of the control unit and in the first mode, receiving a value of the time for opening and/or closing the door leaf from the user interface, calculating a value of the current that should be applied to the drive unit during acceleration and braking to obtain said value of the time for opening and/or closing the door leaf, and setting the calculated value of the current in said control unit, such that the door operator employs the first speed trajectory when opening and/or closing a door leaf connected to the door operator corresponding to the set value of the time and in the second mode receiving a value of the current that should be applied to the drive unit when opening and/or closing the door leaf from the user interface, setting the value of the current in the control unit that should be applied to the drive unit during acceleration and braking such that the door operator employs the first speed trajectory when opening and/or closing a door leaf connected to the door operator corresponding to the set value of the current.

Such a solution allows for a method to set up a door operator in two different ways. A first way that is based on a value of time received from the user interface and a second way that is based on a value of the current received from the user interface. Setting up the door operator based on a value of the current makes it possible to set up the door operator in a manner that is efficient with regard to energy consumption and at the same time to have a time to open and close the door that is within a desired value.

This also makes it possible to reduce the mechanical wear of the door operator and the door set, since if the value of the current could be lowered the mechanical forces are also lowered.

According to one aspect, the value of the current in the control unit that should be applied to the drive unit during acceleration and braking could comprise the step of setting the value of the current that should be applied to the drive unit during acceleration to be the same as the value of the current that should be applied to the drive unit during braking.

By setting the value of the current to be the same during acceleration and braking, a first speed trajectory is obtained that reduces the energy consumption of the door operator.

According to one aspect, the control unit used to control the drive unit could be set to accelerate during a first period of time and the time that the control unit (9) should control the drive unit (7) to brake during could be set to a second period of time.

According to one aspect, the first period of time could be set to correspond to the second period of time.

According to one aspect, the sum of the first period of time and the second period of time could be set to correspond to the time for employing the first speed trajectory.

According to one aspect, the method could further comprise the steps of detecting a second phase mode of set up of the control unit, receiving a value of the time for the door operator to employ a second speed trajectory to the door leaf from the user interface, calculating a value of the current that should be applied to the drive unit during acceleration and braking for employing the second speed trajectory to the door leaf, and setting the calculated value of the current in the control unit such that the door operator employs the second speed trajectory after the first speed trajectory.

According to one aspect, the first speed trajectory could be employed when opening or closing the door leaf from an angle of 0 degrees to an angle of 80 degrees.

According to one aspect, the second speed trajectory could be employed when opening or closing the door leaf from an angle of 81 degrees to an angle of 90 degrees.

According to one aspect, the step of setting the value of the current could be repeated until a desired time for employing the first speed trajectory is obtained.

According to a second aspect of the present invention, these objects are achieved by a door operator for employing a first speed trajectory when opening and/or closing a door leaf connected to the door operator, comprising a drive unit, a user interface and a control unit, wherein the control unit is connected to the drive unit and adapted to control the value of the current applied to the drive unit, the drive unit is adapted to be connected to the door leaf and to move the door leaf connected to the door operator, and the control unit is adapted to detect a first or a second mode of set up of the control unit, and in the first mode, receive a value of the time for opening and/or closing the door leaf from the user interface, calculate a value of the current that should be applied to the drive unit during acceleration and braking to obtain the value of the time for opening and/or closing the door leaf, and set the calculated value of the current in the control unit such that the door operator employ a first speed trajectory when opening and/or closing the door leaf connected to the door operator corresponding to the set value of the time, in the second mode receive a value of the current that should be applied to the drive unit for opening and/or closing the door leaf from the user interface, set the value of the current in the control unit that should be applied to the drive unit during acceleration and braking such that the door operator employs a first speed trajectory when opening and/or closing the door leaf connected to the door operator corresponding to the set value of the current.

Such a solution allows for a door operator that can be set up in two different ways. A first way that is based on a value of time received from the user interface and a second that is based on a value of the current received from the user interface. Setting up the door operator based on a value of the current makes it possible to set up the door operator in a manner that is efficient with regard to energy consumption and at the same time have a time to open and close the door that is within a desired value.

The solution allows for a door operator that could be set up in an energy efficient way.

According to one aspect, the drive unit could comprise a motor.

According to one aspect, the drive unit comprise a gear box.

According to one aspect, the control unit could be adapted to control the acceleration and the braking of the drive unit.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

This and other aspects of the present invention will now be described in more detail, with reference to the appended drawings showing currently preferred embodiments of the invention.

DETAILED DESCRIPTION

Aspects of the present disclosure will be described more fully hereinafter with reference to the accompanying figures. The assembly and method disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present invention relates to door operators for different types of door sets and door leafs. More specifically, the invention relates to door operators for a swing door set and a sliding door set.

In FIGS. 1 to 4 a door operator 1 is disclosed that is connected to a door leaf 2 of a swing door set 3 and adapted to move the door leaf 2 from an open position to a closed position and from a closed position to an open position.

Figure 5:
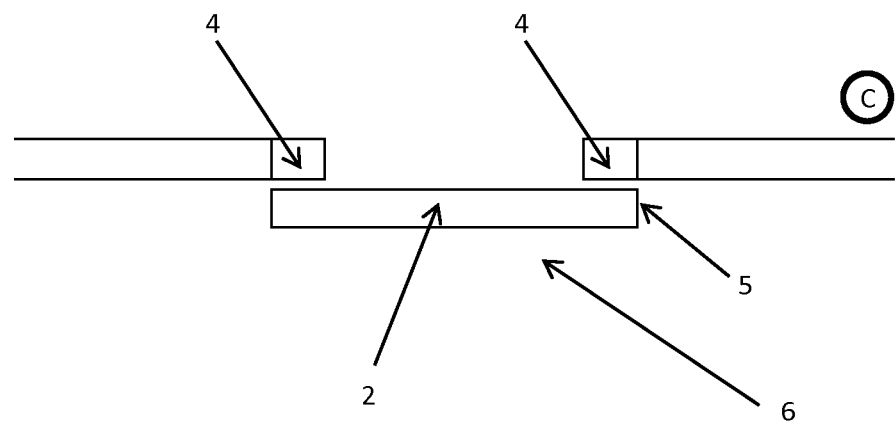
FIG. 5 shows a schematic top view of a sliding door with one door leaf, wherein the door leaf is arranged in a closed position.
Figure 6:
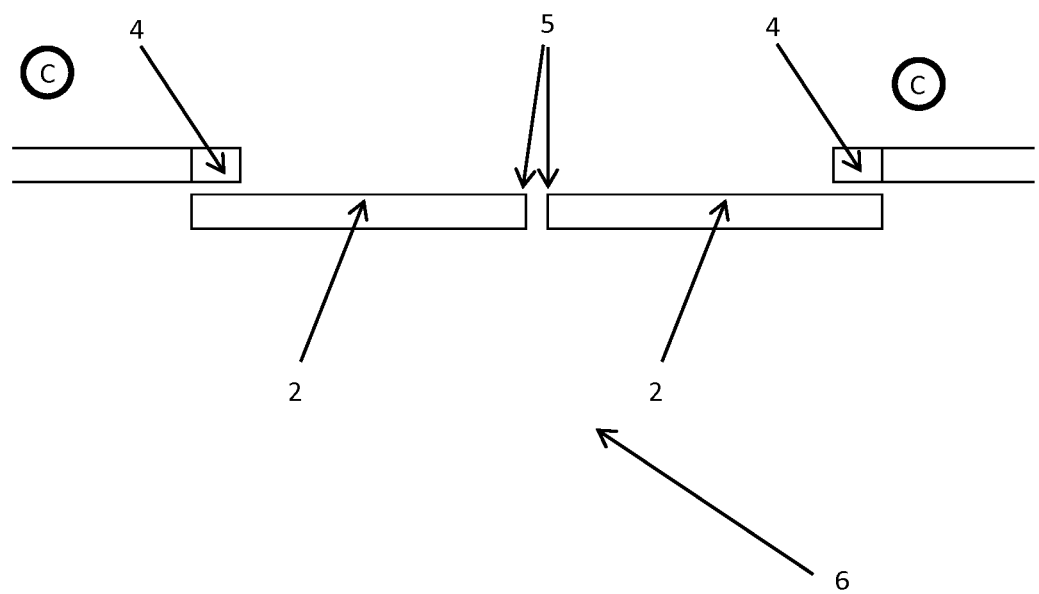
FIG. 6 shows a schematic top view of a sliding door with two door leafs, wherein the two door leaves are arranged in a closed position.

In FIGS. 5 and 6 a sliding door set 6 is disclosed that is adapted to be connected to a door operator 1.

A swing door set generally refers to a door set having one or two door leafs 2, i.e. a single leaf swing door set 3 or a double leaf swing door set 3, where each swing door leaf is hinged or pivoted to the door frame at one of its edges.

When the swing door set 3 is provided with only one door leaf 2, the swing door leaf 2 is hinged or pivoted at one edge to the door frame 4, while the main opening/closing edge 5 of the door leaf 2 closes against, and preferably locks with, the corresponding edge of the door frame 4.

When the swing door set 3 is provided with two swing door leafs 2, the swing door set 3 may comprise two identical swing door leafs 2a, b, arranged side by side with their respective opening/closing edges 3 in close proximity to each other when both door leafs 2a, b are in the closed position.

Also, the swing door set 3 may comprise a master swing door leaf 2a, provided with a flange extending along its main opening/closing edge 3, and a slave door leaf 2b. The flange of the master door leaf 2a is adapted to protrude over the main opening/closing edge 3 of the slave door leaf 2b, when both door leafs 2a, 2b are in the closed position. With such an arrangement, the door leafs 2a, 2b can be pushed open in one direction only, preferably from the inside of a room or building in a direction outwards towards the exterior, a corridor, or an evacuation route. The main opening/closing edge 3 of the master door leaf 2a closes against, and preferably locks into, an opposing opening/closing edge, i.e. the main opening/closing edge 5, of the slave door leaf 2b.

Correspondingly, a sliding door set 6 generally refers to a sliding door set 6 having one or two door leafs 2, i.e. a single leaf sliding door set or a double leaf sliding door set, where each door leaf 2 hangs from, and slides along, a rail arranged in parallel with the upper horizontal edge of the door frame 4. Each sliding door leaf 2 has a main opening/closing edge 5, whose distance from an opposing edge, which refers to either an edge formed by the main opening/closing edge 3 of a counter closing door leaf 2, or a fixed edge or a surface towards which the door leaf 2 is moving, such as a door frame 4, determines the usable opening of the sliding door set 6.

When the sliding door set 6 is provided with only one door leaf 2, the main opening/closing edge 5 of the door leaf 2 closes against, and preferably locks with, an edge of the door frame 2.

When the sliding door set 6 is provided with two sliding door leafs 2*a*, 2*b*, the main opening/closing edge 3 of the first door leaf 2*a* closes against, and preferably locks with, the corresponding edge of a second door leaf 2*b*.

In a swing door set 3, the open position means that the door leaf 2 is opened to an angle $\alpha$ of approximately 80-110° in relation to the surrounding walls, which is a common door opening angle during regular use. The closed position means that the swing door leaf is arranged at a 0° angle, i.e. the door opening is completely closed by the door leaf 2.

In a sliding door set, the open position means that the door leaf 2 is arranged in one of its end positions, i.e. the end position wherein the door opening is open. The closed position means that the opening/closing edge 5 of the door leaf 2 is arranged at the edge which it closes against, i.e. the door opening is completely closed. By "edge" is meant one side of a door frame or the opening/closing edge of a further sliding door leaf 2.

Figure 1:
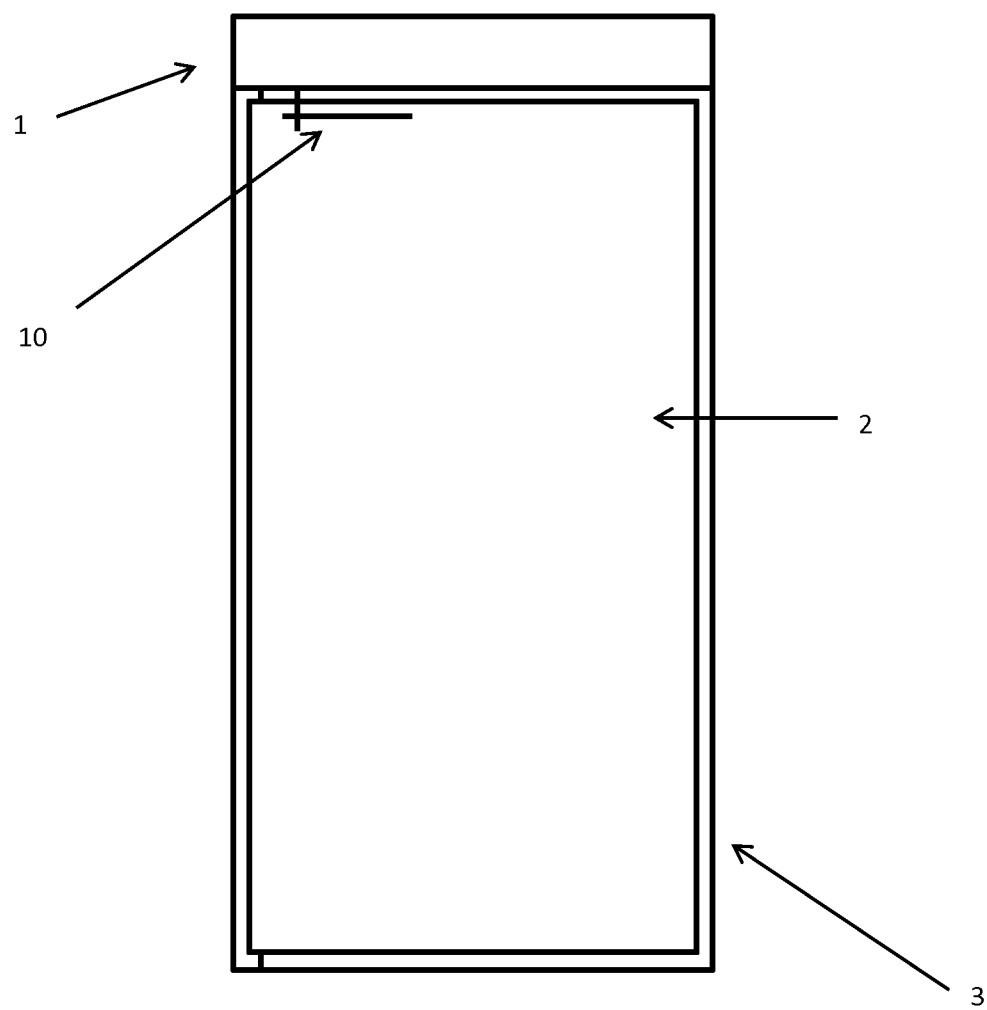
FIG. 1 discloses a door operator connected to a swing door.
Figure 2:
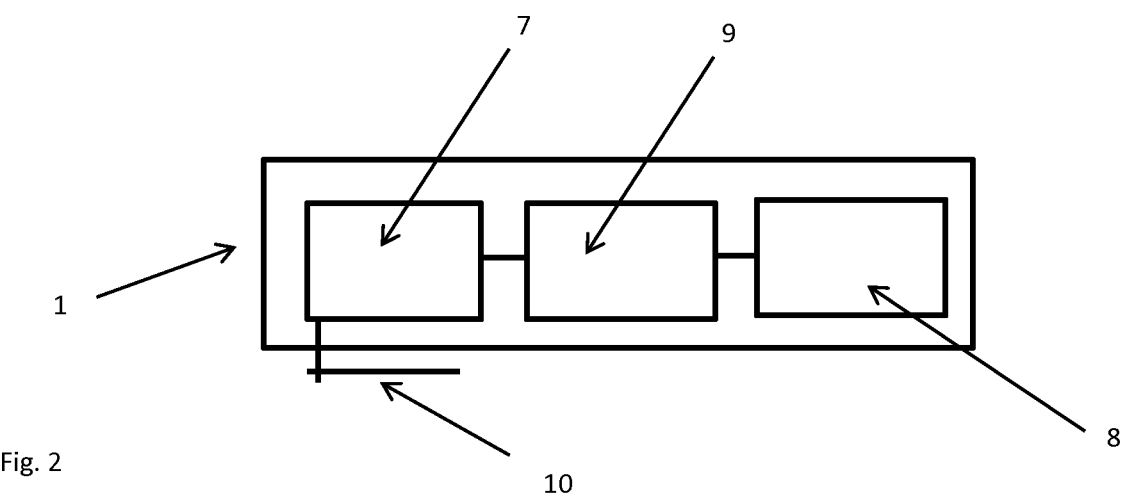
FIG. 2 disclose a schematic view of a door operator.

A sliding door set 6 comprises at least one door leaf 2 and at least one door operator 1. The sliding door set 6 preferably comprises of one of the following combinations: one door leaf 2, as shown in FIG. 5, and one door operator 1, as shown in FIGS. 1 and 2, two sliding door leafs 2*a, b*, as shown in FIG. 6 and one door operator 1, operating both sliding door leaves 2*a, b*, or two sliding door leafs 2*a, b* and two door operators 1, each sliding door leaf 2*a, b* being connected to its own door operator 1. Embodiments comprising two sliding door leafs 2*a, b* are shown in FIG. 6.

Figure 3:
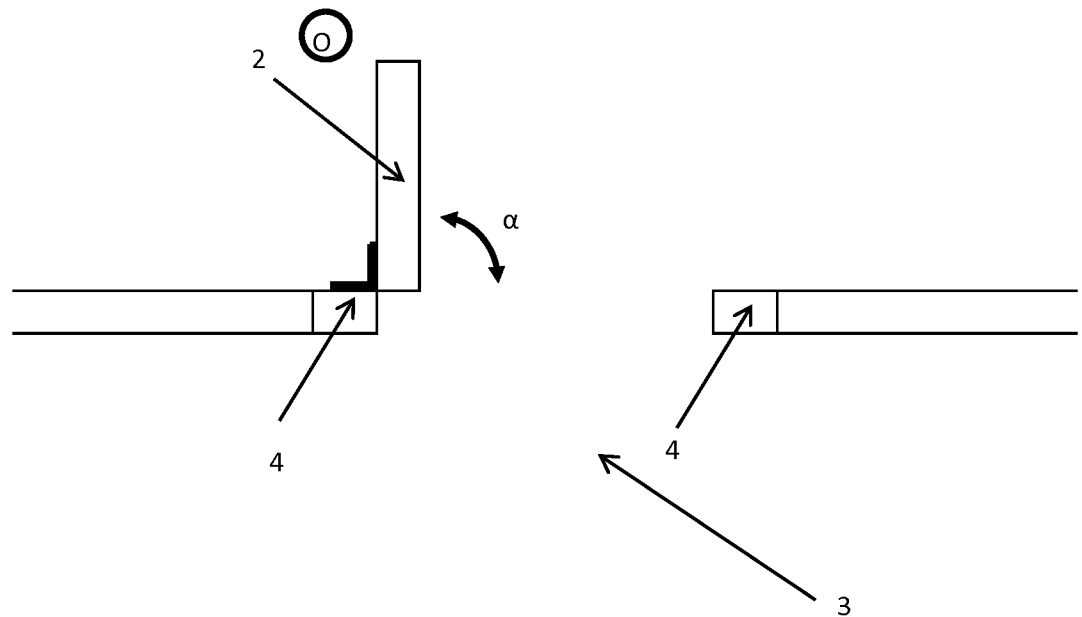
FIG. 3 shows a schematic top view of a swing door with one door leaf, wherein the door leaf is arranged in an open position.
Figure 4:
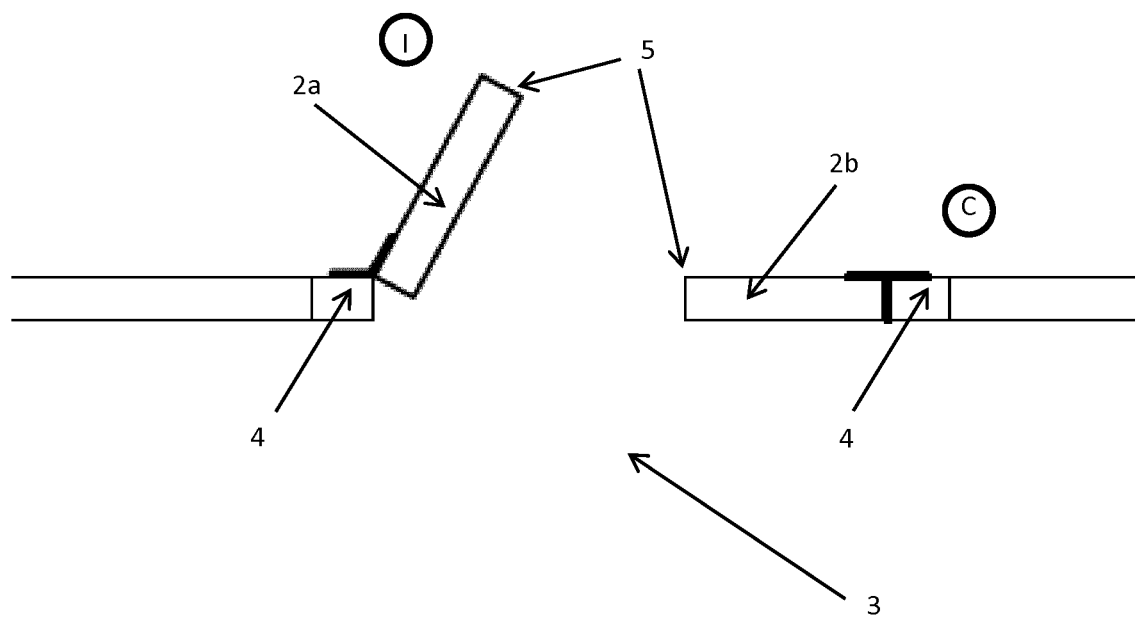
FIG. 4 shows a schematic top view of a swing door with two door leafs, wherein one door leaf is arranged in an intermediate position and one door leaf is arranged in a closed position.

A swing door set 3 comprises of at least one door leaf 2 and at least one door operator 1. The swing door set 3 preferably comprises of one of the following combinations: one door leaf 2 and one door operator 1, as shown in FIGS. 1 and 3, or two swing door leafs 2*a*, 1*b* and two door operators 1, each door leaf 2*a*, 2*b* being connected to its own door operator 1, as shown in FIG. 4.

The door operator 1 is connected to the door leaf 2 and moves the door leaf 2 from its open position to its closed position and from its closed position to its open position.

In FIGS. 1 and 2 a door operator 1 is disclosed that comprises a drive unit 7, a user interface 8 and a control unit 9. The door operator 1 is connected to a door leaf 2 of a swing door set 3 and adapted to move the door leaf 2 from an open position O to a closed position C and from a closed position C to an open position O.

The drive unit 7 comprise a motor. The drive unit 7 can also comprise a gear box, one or more cams and cam functions and one or more springs and spring functions. The drive unit 7 is also connected to the control unit 9. The drive unit 7 is connected to a power source and the value of the current applied to the drive unit 7 from the power source is controlled by the control unit 9. The drive unit 7 is connected to the door leaf 2 by a lever 10. The drive unit 7 is connected to one end of the lever 10 and the door leaf 2 is connected to a second end of the lever 10. The type of connection between the drive unit 7 and the door leaf 2 is dependent on the type of the door set and the door operator 1 and is well known in the art of door operators 1. Thus, the specific features of how the connection between the door operator 1 and the door leaf 2 are not described in detail in this application.

The drive unit 7 accelerates when a positive current is applied to the motor. The drive unit 7 is braked when a negative current is applied to the motor. However, the drive unit 7 can also be installed such that is accelerated when a negative current is applied to the motor and braked when a positive current is applied to the motor. The drive unit 7 moves the door leaf 2 in relation to the current that is applied to the drive unit 7.

The user interface 8 is connected to the control unit 9 and configured to send input received at the user interface 8 to the control unit 9. An input that can be received via the user interface is parameters of the first speed trajectory or input of a first or a second mode of set up of the control unit 9. The user interface 8 can comprise a display and be configured to receive input from the control unit 9 and to display the input. The user interface 8 can be switches, a touch screen, dip switches, potentiometers, buttons, a data port such as a USB-port or any combination thereof. The user interface 8 can according to an aspect be connected to the control unit 9 via a wireless connection. The user interface 8 can according to one aspect be remote from the control unit 9. The detecting of a first or a second mode of set up of the control unit 9 can also be made by other means of the door operator 1 such as via information received from the wireless connection.

The control unit 9 is connected to the user interface 8 and the drive unit 7. The control unit 9 comprise a memory and a central processing unit. The control unit 9 is configured to control the applied current to the drive unit 7. The control unit 9 could be configured to control the value of the current applied to the drive unit 7. The control unit 9 is configured to control the value of the current applied at different times during the first speed trajectory to the drive unit 7. The control unit 9 is configured to receive information and data received at the user interface 8.

The control unit 9 as such is well known in the art of door operators 1. Thus, the specific features of the connection between the control unit 9, the drive unit 7 and the user interface 8 are not described in detail in this application.

The door operator 1 employs a first speed trajectory to the door leaf 2 when opening and closing the door leaf 2. The first speed trajectory defines how the door operator 1 moves the door leaf 2, how much and when it is accelerated, how much and when it is braked, how long time it should take to open the door leaf 2, how long time it should take to close the door leaf 2 and the angle $\alpha$ that the door leaf 2 should be opened to. The first speed trajectory is defined by a number of set up parameters in the control unit 4. When the door operator 1 is installed there are a number of parameters that are installed in the door operator in the factory when building the door operator 1, however, there are also a number of set up parameters that needs to be set on site when the door operator 1 are installed. The set up parameters are dependent of the surroundings and location at which the specific door operator 1 is installed and to the specific door leaf 2 to which it is connected. The set up parameters that are dependent on the surroundings and location is set during the installation of the door operator 1 on site. One of the set up parameters that are set on site is the period/value of the time that it should take for the door operator 1 to move the door leaf 2 from its open position O to its closed position C and from its closed position C to its open position O.

According to one aspect, one of the set up parameters that is set on site are the value of the time that it should take for the door operator 1 to move the door leaf 2 from its open position O to an intermediate position I and from the intermediate position I to the closed position C and from the closed position C to an intermediate position I and from the intermediate position I to the open position O.

According to one aspect, one of the set up parameters that could be set is the value of the current that should be applied to the drive unit 7.

According to one aspect, one of the set up parameters that are set is if the door operator 1 should set the first speed trajectory to be based on a value of the time that the first speed trajectory should take for moving the door leaf 2 or on a value of the current that should be applied to the drive unit 7.

According to one aspect, the door operator 1 that is connected to the door leaf 2 is adapted to employ a first speed trajectory when moving the door leaf 2, i.e. closing or opening the door. The first speed trajectory comprise moving the door leaf 2 from the open position O to the closed position C and from the open position O to the closed position C.

The first speed trajectory is initiated, by the door operator 1, in response to a closing or opening command and is performed by the control unit 9 controlling the value of the current applied to the drive unit 7 during the opening or closing.

A closing command is performed in the control unit 1 when an individual, or other obstacle, is no longer detected in the closing path of the door, or after a predetermined time interval has passed from the time of opening the door leaf 2.

According to one aspect, the door operator 1 that is connected to a swing door set 3 is adapted to employ the first speed trajectory and a second speed trajectory when moving the door leaf 2 from the open position O to the closed position C, i.e. closing the door. The first speed trajectory comprise moving the door leaf 2 from the open position O to an intermediate position I and the second speed trajectory comprise moving the door leaf 2 from the intermediate position I to the closed position C. The first speed trajectory is initiated, by the door operator 1, in response to a closing or opening command and is performed by the control unit 9 controlling the value of the current applied to the drive unit 7 during the opening or closing. The second speed trajectory is employed after the first speed trajectory has been employed.

According to an aspect, when a closing command has been received by the door operator 1, the door leaf 2 is moved, using the first speed trajectory, from its open position O at an angle α of preferably 80-110° to the closed position C. The closed position C equals the completely closed position, i.e. a 0° angle.

According to an aspect, when a closing command has been received by the door operator 1, the door leaf 2 is moved, using the first speed trajectory, from its open position O at an angle α of preferably 80-110°, to an intermediate position I at an angle β of preferably 10°. Thereafter, the door leaf 2 is moved, using a second speed trajectory, from its intermediate position I to the closed position C. The closed position C equals the completely closed position, i.e. a 0° angle.

According to an aspect, the door set may comprise one or two door leafs 2, and the door set 3, 6 may be of the swing door type or the sliding door type. When having two door leafs, the first and second predetermined speed trajectories are preferably initiated simultaneously for both door leafs 2a, 2b, even though they may be initiated with some delay.

The control unit 9 is configured to control the drive unit 7 such that the door operator 1 employs the first speed trajectory to the door leaf 2. The shape and size of the first speed trajectory are dependent on a number of setup parameters stored in the control unit 9 or in a memory connected to the control unit 9. When the door operator 1 is set up, the set up parameters of the first speed trajectory is set in the control unit 9. The set up parameters comprise one or more of the time for moving the door leaf 2 from the closed position C to the open position O, the time for moving the door leaf 2 from the open position O to the closed position C, the time for moving the door leaf 2 from the closed position C to the intermediate position I, the time for moving the door leaf 2 from the open position O to the intermediate position I, the time for moving the door leaf 2 from the intermediate position I to the closed position C, the time for moving the door leaf 2 from the intermediate position I to the open position O, the value of the current applied to the drive unit 7 when employing the first speed trajectory, the value of the current applied to the drive unit 7 during different periods when employing the first speed trajectory, the period of the opening and closing that the drive unit 7 should be accelerated, the period of the opening and closing that the drive unit 7 should be braked, how much the motor should be accelerated and/or how much the motor should be braked. The time for opening and closing the door leaf 2 according to the first speed trajectory corresponds to the value of the current applied to the drive unit 7.

The control unit 9 is adapted to receive and set the set up parameters regarding the opening and closing of the door leaf 2 in a first mode or in a second mode. The control unit 9 is adapted to detect the first or a second mode of set up of the control unit 9. The control unit 9 can detect the first or second mode from input received from the user interface 8. According to one aspect the control unit 9 can detect the first or second mode from information received via a wireless connection.

In the first mode, the control unit 9 receives a value of the time for opening and/or closing the door leaf 2 from the user interface. Thereafter, the control unit 9 calculates a value of the current that should be applied to the drive unit 7 during acceleration and braking to obtain said time for opening and/or closing the door leaf 2. Thereafter, the calculated value of the current is set in the control unit 9 such that the door operator 1 employs the first speed trajectory when opening and/or closing the door leaf 2 connected to the door operator 1 that corresponding to the set value of the time.

In the second mode, the control unit 9 receives a value of the current that should be applied to the drive unit 7 for opening and/or closing the door leaf 2 from the user interface 8. Thereafter, the value of the current is set in said control unit 9 that should be applied to the drive unit 7 during acceleration and braking such that the door operator 1 employs the first speed trajectory when opening and/or closing the door leaf 2 connected to the door operator 1 that corresponding to the set value of the current.

By having a first and a second mode of set up the door operator 1 can either be set up in a way by setting the time for the door to be opened and closed or be set up in a way in which the energy/power consumption can be optimized. By setting the value of the current directly in the door operator 1 it can be set-up with the lowest value of the current that still fulfils the needed or wanted time for opening and closing the door. The value of the current applied to the drive unit 7 and set in the door operator 1 corresponds to the energy consumption of the door operator 1 when employing the first speed trajectory. If the value of the current is lowered, the energy consumed when employing the first speed trajectory is lowered and if the value of the current is increased, the energy consumed when employing the first speed trajectory is also increased.

However, when the value of the current applied to the drive unit 7 is changed, this also affects the time for employing the first speed trajectory. If the value of the current is lowered, the time for employing the first speed trajectory is increased and if the value of the current is increased the time for employing the first speed trajectory is decreased.

The energy consumption of the door operator 1 is a function of the value of the current and the time during which the value of the current is applied. One way of calculating the energy consumption of the door operator 1 is to multiply the current applied (I) times the square of the time (t), i.e. (I)*(t)2.

When the door operator 1 should be set up and the set-up parameters should be set in the door operator 1 the following method is performed in the door operator 1.

Detecting if the door operator 1 should be set up in a first or a second mode of set up of the control unit 9.

If the first mode is detected, receiving a value of the time for opening and/or closing the door leaf 2 from the user interface 8. Thereafter, calculating a value of the current that should be applied to the drive unit 7 during acceleration and braking to obtain said time for opening and/or closing the door leaf 2 and setting the calculated value of the current in said control unit 9 such that the door operator 1 employs a first speed trajectory when opening and/or closing a door leaf 2 connected to the door operator 1 corresponding to said set value of the time.

After performing the steps in the first mode, the door operator 1 is set up and the door operator 1 employs a first speed trajectory corresponding to the received value of the time when opening and/or closing a door leaf 2 connected to the door operator 1.

If instead the second mode is detected, receiving a value of the current that should be applied to the drive unit 7 for opening and/or closing the door leaf 2 from the user interface 8. Thereafter, setting the value of the current in said control unit 9 that should be applied to the drive unit 9 during acceleration and braking such that the door operator 1 employs a first speed trajectory when opening and/or closing a door leaf 2 connected to the door operator 1 corresponding to said set value of the current.

After performing the steps in the second mode, the door operator 1 is set-up and the door operator 1 employs the first speed trajectory corresponding to the received value of the current when opening and/or closing the door leaf 2 connected to the door operator 1. If the time of the first speed trajectory that corresponds to the received value of the current is to short or too long, the door operator 1 could receive another value of the current and repeat the steps in the second mode. This could be repeated until the first speed trajectory with the lowest value of the current is obtained that also obtains a time of the first speed trajectory that is wanted and/or needed.

By set up of the door operator 1 in the second mode a first speed trajectory with the lowest energy consumption could be set up in the door operator 1. According to one aspect, the value of the current does not have to indicate the exact current as such, it only can indicate the value of the current between a maximum and minimum current that could be applied to the drive unit 7. According to one aspect, the value of the current that could be set is between 1-10, where 1 corresponds to the lowest value of the current that could be applied to the drive unit 7 and 10 corresponds to the highest value of the current that could be applied to the drive unit 7.

According to one aspect, the step of setting the value of the current in said control unit 9 that should be applied to the drive unit 7 during acceleration and braking comprises the step of setting the current that should be applied to the drive unit 7 during acceleration and braking to be the same.

According to one aspect, the step of setting the control unit 9 to control the drive unit 7 to accelerate during a first period of time and setting the time that the control unit should control the drive unit 7 to brake during a second period of time.

According to one aspect, the first period of time could be set to correspond to the second period of time. By setting the value of the current to be the same during acceleration and braking a first speed trajectory is obtained that reduces the energy consumption of the door operator 1.

According to one aspect, the linearity of the exchange in the drive unit 7 and possible spring functions in the door operator 1 affects when in the drive unit 7 should start braking to obtain a proper opening and closing of the door leaf 2.

According to one aspect, after the door leaf 2 have been mounted in its position, the door operator 1 runs a set up cycle to obtain a number of parameters related to the geometry of the door leaf 2.

According to one aspect, the sum of the first period of time and the second period of time is set to correspond to the time for employing the first speed trajectory.

According to one aspect, the method further comprises the step of detecting a second phase mode of set up of the control unit, receiving a value of the time for employ the second speed trajectory to the door leaf 2 from the user interface 8, calculating a value of the current that should be applied to the drive unit 7 during acceleration and braking for employing the second speed trajectory to the door leaf 2, and setting the calculated value of the current in said control unit 9 such that the door operator 1 employs the second speed trajectory after the first speed trajectory.

According to one aspect, the first speed trajectory is employed when opening or closing the door from an angle of 0 degrees to an angle of 80 degrees.

According to one aspect, the time for moving the door leaf 2 the last 10 degrees when opening and closing the door are set in the control unit 9 based on the time for employing the first speed trajectory.

According to one aspect, the second speed trajectory are employed during the opening or closing the door from an angle of 81 degrees to an angle of 90 degrees According to one aspect, the second speed trajectory is employed during last 10 degrees when opening and closing the door.

According to one aspect, the step of setting the value of the current in the second mode is repeated until a desired time for employing the first speed trajectory is obtained.

The person skilled in the art realizes that the present invention by no means is limited to the preferred embodiments described above. On the contrary, many modifications and variations are possible within the scope of the appended claims. For example, a sliding door set may comprise of more than two sliding door leafs, arranged in the same way as discussed above.

The invention claimed is:
1. Method for set up of a door operator (1) comprising a drive unit (7), a user interface (8) and a control unit (9), which control unit (9) controls the value of the current applied to the drive unit (7) such that the door operator (1) employs a first speed trajectory corresponding to said value of the current when opening and/or closing a door leaf (2) connected to the door operator (1), the method comprising the steps of:

detecting a first or a second mode of set up of the control unit (9), and in the first mode, receiving a value of the time for opening and/or closing the door leaf (2) from the user interface (8), calculating a value of the current that should be applied to the drive unit (7) during acceleration and braking to obtain said value of the time for opening and/or closing the door leaf (2), and setting the calculated value of the current in said control unit (9), such that the door operator (1) employs the first speed trajectory when opening and/or closing a door leaf (2) connected to the door operator (1) corresponding to said set value of the time, in the second mode receiving a value of the current that should be applied to the drive unit (7) when opening and/or closing the door leaf (2) from the user interface (8), setting the value of the current in said control unit (9) that should be applied to the drive unit (7) during acceleration and braking such that the door operator (1) employs the first speed trajectory when opening and/or closing a door leaf (2) connected to the door operator (1) corresponding to said set value of the current.

2. Method according to claim 1, wherein the step of setting the value of the current in said control unit (9) that should be applied to the drive unit (7) during acceleration and braking comprises the step of setting the value of the current that should be applied to the drive unit (7) during acceleration to be the same as the value of the current that should be applied to the drive unit (7) during braking.

3. Method according claim 1, further comprising the step of setting the control unit (9) to control the drive unit (7) to accelerate during a first period of time and setting the time that the control unit (9) should control the drive unit (7) to brake during a second period of time.

4. Method according to claim 3, further comprising the step of setting the first period of time to correspond to the second period of time.

5. Method according to claim 3, further comprising the step of setting the sum of the first period of time and the second period of time to correspond to the time for employing the first speed trajectory.

6. Method according to claim 1, further comprising the step of detecting a second phase mode of set up of the control unit (9), receiving a value of the time for the door operator (1) to employ a second speed trajectory to the door leaf (2) from the user interface (8), calculating a value of the current that should be applied to the drive unit (7) during acceleration and braking for employing the second speed trajectory to the door leaf (2), and setting the calculated value of the current in said control unit (9) such that the door operator (1) employs the second speed trajectory after the first speed trajectory.

7. Method according to claim 1, wherein the first speed trajectory is employed when opening or closing the door leaf (2) from an angle of 0 degrees to an angle of 80 degrees.

8. Method according to claim 1, wherein the speed trajectory is employed when opening or closing the door leaf (2) from an angle of 81 degrees to an angle of 90 degrees.

9. Method according to claim 1, wherein in the second mode, the step of setting the value of the current is repeated until a desired time for employing the first speed trajectory is obtained.

10. Door operator (1) for employing a first speed trajectory when opening and/or closing a door leaf (2) connected to the door operator (1), comprising a drive unit (7), a user interface (8) and a control unit (9), wherein the control unit (9) is connected to the drive unit (7) and adapted to control the value of the current applied to the drive unit (7), the drive unit (7) is adapted to be connected to the door leaf (2) and to move the door leaf (2) connected to the door operator (1), and the control unit (9) is adapted to detect a first or a second mode of set up of the control unit (9), and in the first mode, receive a value of the time for opening and/or closing the door leaf (2) from the user interface (8), calculate a value of the current that should be applied to the drive unit (7) during acceleration and braking to obtain said value of the time for opening and/or closing the door leaf (2), and set the calculated value of the current in said control unit (9) such that the door operator (1) employs a first speed trajectory when opening and/or closing the door leaf (2) connected to the door operator (1) corresponding to said set value of the time, in the second mode receive a value of the current that should be applied to the drive unit (7) for opening and/or closing the door leaf (2) from the user interface (8), set the value of the current in said control unit (9) that should be applied to the drive unit (7) during acceleration and braking such that the door operator (1) employs the first speed trajectory when opening and/or closing the door leaf (2) connected to the door operator (1) corresponding to said set value of the current.

11. Door operator (1) according to claim 10, wherein the drive unit (7) comprises a motor.

12. Door operator according to claim 10, wherein the drive unit (7) comprises a gear box.

13. Door operator according to any of claim 10, wherein the control unit (9) is adapted to control the acceleration and the braking of the drive unit (7).

* * * * *